(12) United States Patent
Kim et al.

(10) Patent No.: US 8,588,873 B2
(45) Date of Patent: Nov. 19, 2013

(54) METHOD AND APPARATUS WITH A SLIDING MECHANISM

(75) Inventors: Young Kim, San Diego, CA (US); Tommi Teuri, Teijo (FI); Mamoru Nagase, Tokyo (JP); Masayuki Amano, Kanagawa (JP); Mikko Timperi, Raisio (FI)

(73) Assignee: Nokia Corporation, Espoo (FI)

( * ) Notice: Subject to any disclaimer, the term of this patent is extended or adjusted under 35 U.S.C. 154(b) by 601 days.

(21) Appl. No.: 12/459,087

(22) Filed: Jun. 25, 2009

(65) Prior Publication Data

US 2010/0329596 A1 Dec. 30, 2010

(51) Int. Cl.
*H04M 1/00* (2006.01)

(52) U.S. Cl.
USPC .................... 455/575.4; 455/575.3

(58) Field of Classification Search
USPC ........................ 455/90.1, 550.1, 575.1–575.4; 379/433.12
See application file for complete search history.

(56) References Cited

U.S. PATENT DOCUMENTS

| | | | |
|---|---|---|---|
| 2003/0064688 A1* | 4/2003 | Mizuta et al. | 455/90 |
| 2004/0198246 A1* | 10/2004 | Tsai | 455/90.1 |
| 2006/0046783 A1* | 3/2006 | Bae | 455/558 |
| 2008/0015001 A1* | 1/2008 | Huang et al. | 455/575.4 |
| 2008/0075274 A1* | 3/2008 | Huang et al. | 379/433.12 |
| 2009/0029748 A1* | 1/2009 | Lee | 455/575.4 |
| 2009/0159760 A1* | 6/2009 | Gan et al. | 248/121 |
| 2009/0286580 A1* | 11/2009 | Murakoso et al. | 455/575.4 |
| 2010/0124006 A1* | 5/2010 | Chang | 361/679.04 |
| 2010/0329596 A1* | 12/2010 | Kim et al. | 384/24 |
| 2011/0086683 A1* | 4/2011 | Kfoury | 455/575.4 |

* cited by examiner

*Primary Examiner* — Jinsong Hu
*Assistant Examiner* — Nathan Taylor
(74) *Attorney, Agent, or Firm* — Harrington & Smith

(57) ABSTRACT

An apparatus including a slider part and a base assembly slidingly movable in relation to each other with the aid of a first guide rail and a second guide rail in the base assembly. The distance between the first guide rail and the second guide rail is adjustable while the apparatus is being assembled. A method is also disclosed.

10 Claims, 3 Drawing Sheets

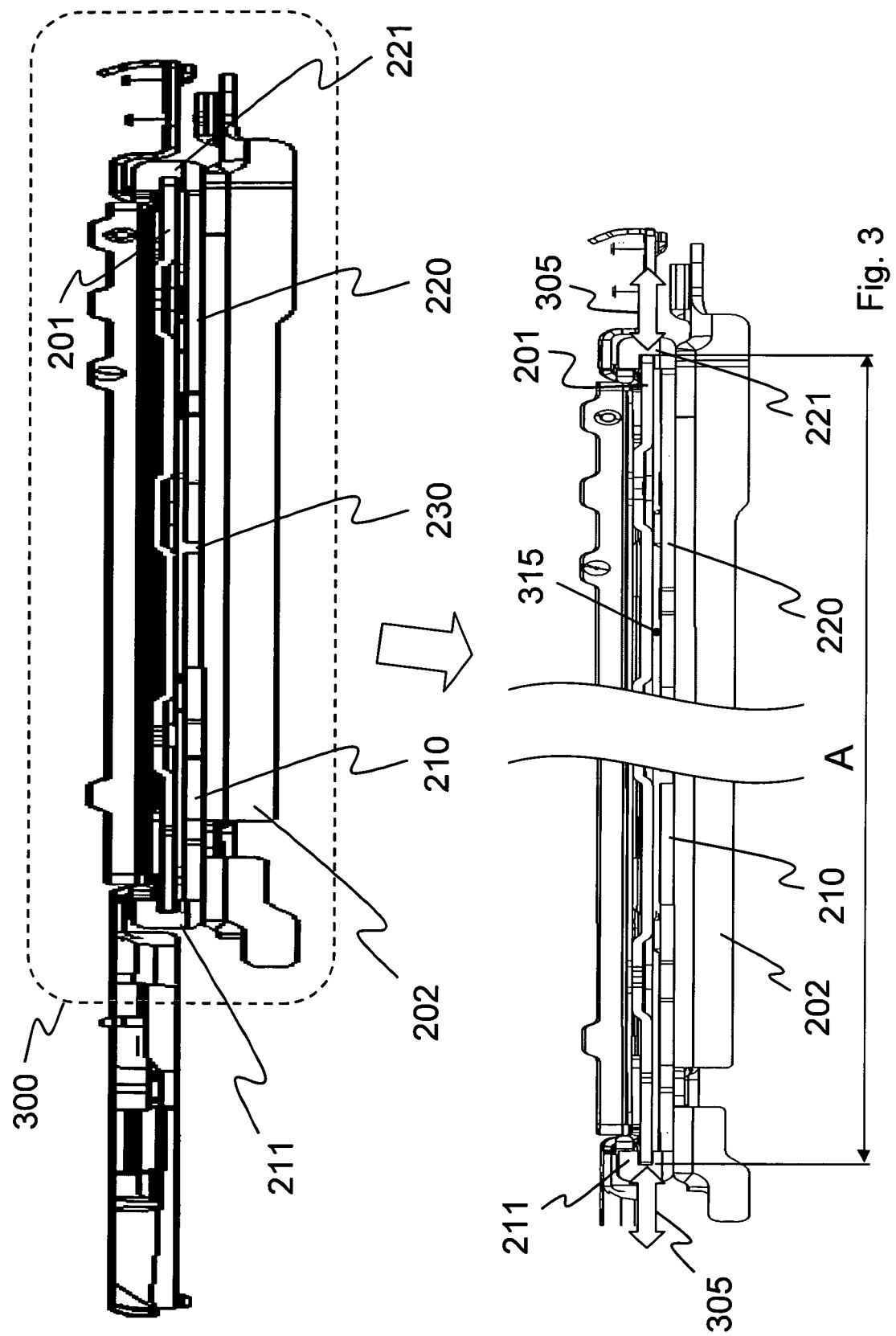

METHOD AND APPARATUS WITH A SLIDING MECHANISM

TECHNICAL FIELD

The present invention generally relates to mobile devices with at least one sliding part.

BACKGROUND ART

Presently, many mobile devices are equipped with sliding parts, such as sliding covers, that make it possible to expand the user interface surface of the device while still keeping the device compact in a closed configuration. The sliding part typically moves along rails installed in a base part of the device. Manufacturing such devices requires a high level of control over clearances between the rail parts. Ideally, the sliding part should be able to move freely without unnecessary friction between the rail parts, but at the same time any extra wobbliness between the parts is undesirable.

The challenge of controlling clearances between rails has been handled by tight control of tolerances in individual parts and the whole assembling process. This is challenging with slide mechanisms, in which distance between rails is large. In some devices the number of rails has been raised above two to counter wobbliness, but this adds cost and complexity to the device.

SUMMARY

According to a first example aspect of the invention there is provided an apparatus comprising:
a slider part and a base assembly slidingly movable in relation to each other with the aid of a first guide rail and a second guide rail in the base assembly, the distance between the first guide rail and the second guide rail being adjustable while the apparatus is being assembled.

In this way the clearance between the guide rails and the slider part may be optimized.

The slider part may contain rails. The slider part itself and/or its rails may slide along the guide rails of the base assembly.

In certain example embodiments, the slider part and the base assembly are slidingly movable in relation to each other in a horizontal landscape direction of the apparatus. The term horizontal landscape direction is used to differentiate from the conventional sliding direction, that is, horizontal portrait direction where the apparatus is slid in order to extend the user interface in the longitudinal direction of the apparatus.

In certain example embodiments, the base assembly comprises a single base part, a first guide rail part comprising the first guide rail and a body section, and a second guide rail part comprising the second guide rail and a body section.

In certain example embodiments, the first guide rail part is attached or attachable to the base part at least on its body section and the second guide rail part is attached or attachable to the base part at least on its body section.

The attachment to the base part may be via a protrusive part of the body section. The body sections of the first and second guide rail parts may be plate-like. The body sections of the first and second guide rail parts may extend towards each other in the apparatus. The body sections of the first and second guide rail parts may leave a space therebetween.

In certain example embodiments, the position of the first guide rail part, and the position of the second guide rail part, respectively, is individually adjustable. The position herein may refer to the position in the base assembly.

In certain example embodiments, the distance between the first guide rail and the second guide rail is adjustable after the slider part has been joined with a part of the base assembly.

In certain example embodiments, the guide rail parts are movably attached to the base part. In certain example embodiments, the guide rail parts as movably attached are loose so that their position in the base assembly can be adjusted, and then fixed by welding, riveting or by another method. A jig or similar may be used in fixing the position.

In certain example embodiments, the apparatus comprises exactly two guide rails. In certain example embodiments, the horizontal landscape sliding movement is accomplished by exactly two guide rail parts each comprising exactly one guide rail. The distance between the guide rails may be adjusted via the guide rail parts.

In certain example embodiments, there is provided a slide module mechanism comprising a slide plate (or slider part), and a base assembly. The base assembly may comprise or substantially consist of a single base part and a first and a second guide rail part. The guide rail parts are configured to co-operate with the slide plate (or rails in the slide plate) to allow a sliding movement of the slide plate and the base assembly in relation to each other. The guide rail parts may be further configured to be adjustable in relation to each other during the assembly process and/or after the slide part is joined with the base assembly. This allows spacing of the guide rails to be adjusted so that clearance between the guide rails and the slide plate (or the rails of the slide plate) is optimized.

In certain example embodiment, there is provided a mechanism comprising guide rail sections which are individually adjustable after the slide module is assembled.

In certain embodiments, the apparatus is a mobile device or a mobile handset, such as a handheld mobile terminal or mobile station. The mobile terminal or station is in certain embodiments a mobile terminal or station of a cellular system, such as a mobile phone.

According to a second example aspect of the invention there is provided a method comprising:
providing an apparatus with a slider part and a base assembly slidingly movable in relation to each other with the aid of a first guide rail and a second guide rail in the base assembly; and
adjusting the distance between the first guide rail and the second guide rail while assembling the apparatus.

In certain example embodiments, the method comprises adjusting the distance with the aid of an adjustment jig.

In certain example embodiments, the method comprises individually adjusting a first guide rail part comprising the first guide rail and a second guide rail part comprising the second guide rail.

In certain example embodiments, the method comprises adjusting a first guide rail part comprising the first guide rail and a second guide rail part comprising the second guide rail in relation to each other after the slider part is joined with the base assembly.

In certain example embodiments, the method comprises movably attaching a first guide rail part comprising the first guide rail and a second guide rail part comprising the second guide to a base part, and subsequently, fixing their position with a permanent attachment. The permanent attachment may be performed, for example, by welding or riveting.

In certain example embodiments, the guide rail parts as movably attached are loose (that is, they can be moved) so that their position in the base assembly (and in relation to the slider part or rails in the slider part) can be adjusted.

Different non-binding exemplary aspects and embodiments of the present invention have been illustrated in the foregoing. The above embodiments are used merely to explain selected aspects or steps that may be utilized in implementations of the present invention. Some embodiments may be presented only with reference to certain exemplary aspects of the invention. It should be appreciated that corresponding embodiments may apply to other exemplary aspects as well.

BRIEF DESCRIPTION OF THE DRAWINGS

The invention will be described, by way of example only, with reference to the accompanying drawings, in which:

FIG. 3 shows adjustment of the slide module of FIG. 2 in further detail in accordance with certain example embodiments;

DETAILED DESCRIPTION

In the following description, like numbers denote like elements.

The following presents an example apparatus and an example method or assembly process in accordance with certain selected example embodiments of the invention.

Figure 1:
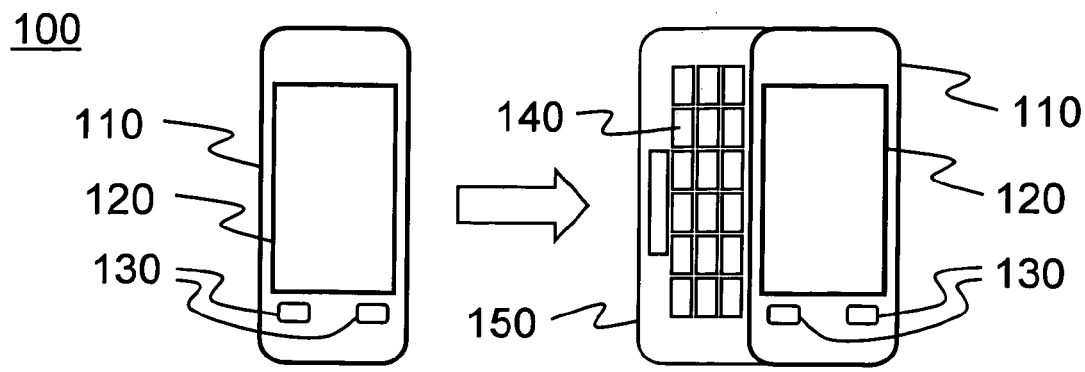
FIG. 1 shows a horizontal landscape sliding movement of an apparatus in accordance with certain example embodiments.

FIG. 1 shows a horizontal landscape sliding movement of an apparatus in accordance with certain example embodiments. In certain embodiments the apparatus 100 is a mobile device, such as a mobile terminal or mobile station. The mobile terminal or station is in certain embodiments a mobile terminal or station of a cellular system, such as a mobile phone.

In the left side of FIG. 1, the apparatus 100 is illustrated in a closed configuration showing a visible front part 110. The apparatus comprises a display 120 and keys 130 on its front user interface. In the right side of FIG. 1, the apparatus is shown in an open configuration revealing a keyboard 140 in a rear part 150.

The apparatus 100 is slid in a horizontal landscape direction between the closed and open configuration. Either of the parts 140 and 150 may form a slider part the remaining part forming a base part.

Figure 2:
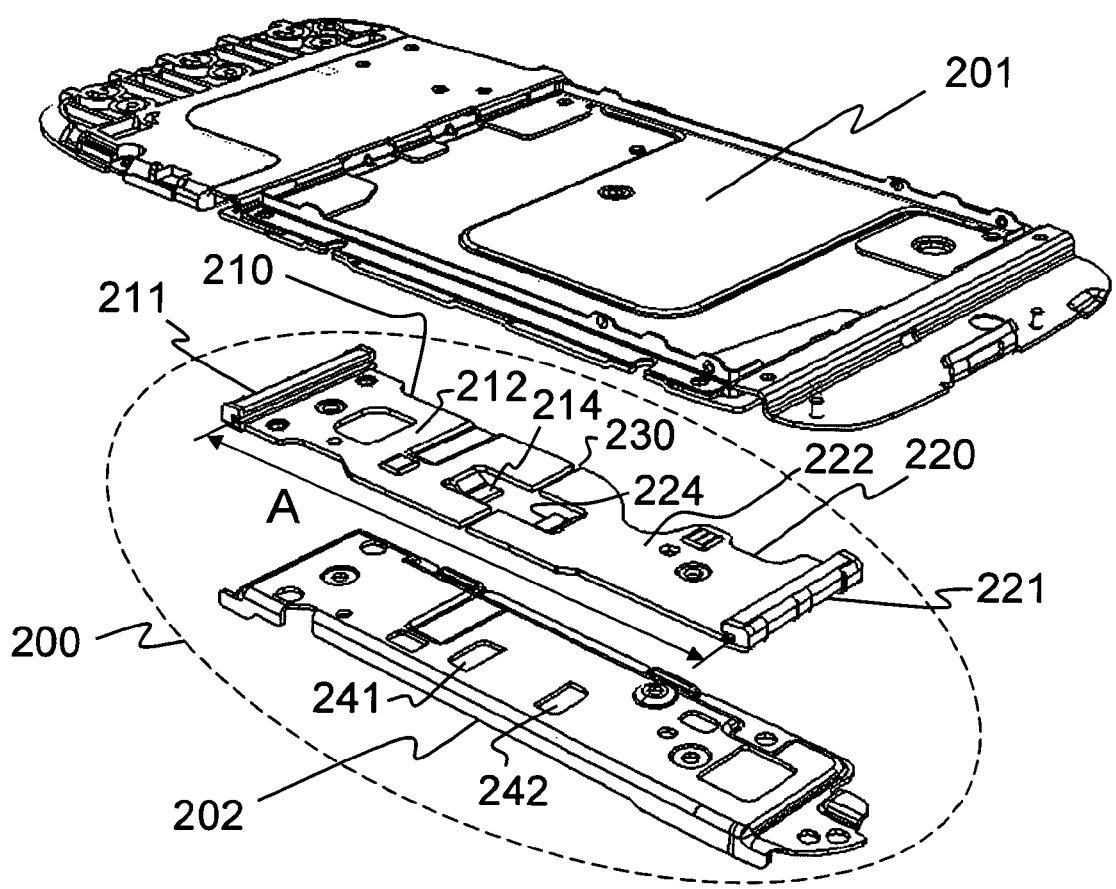
FIG. 2 shows a slide module in accordance with certain example embodiments.

FIG. 2 shows parts of a slide module or mechanism comprising a slider part 201 and a base assembly 200 in accordance with certain example embodiments. The slide module may be a part of the apparatus shown in FIG. 1.

The base assembly 200 comprises a base part 202 with a guide rail part that is, in certain example embodiments, basically split into two parts (or sections) separated by a intermediate space 230. A first guide rail part 210 comprises a first guide rail 211 and a body section 212 that can be plate-like. A second guide rail part 220 comprises a second guide rail 221 and a body section 222 that can be plate-like. The first and second guide rail parts 210 and 220 are attachable to the base part. In certain example embodiments, at least one of the first and second guide rail parts 210 and 220 or both are movably attachable to the base part. In an example arrangement the first guide rail part 210 can be attached with a protrusive part 214 into an opening 241 of the base part 202. The second guide rail part 220 can be attached with a protrusive part 224 into an opening 242 of the base part 202. In certain example embodiments, at least one of the attachments or both are loose so that the position of the parts 210 and 220 in relation to each other can be adjusted (that is, the distance A between the guide rails 211 and 221 is adjustable) after the guide rail part or parts 210 and 220 have been attached to the base part 202 and/or after the guide rail part or parts 210 and 220 have been joined with the slider part 201. An adjustment jig (not shown in FIG. 2), for example, can be used in said adjustment. Once the position of the parts 210 and 220 in the base assembly (and in relation to the slider part 201 or rails (not shown) in the slider part 201) has been adjusted, their position is fixed by a permanent attachment. This can be achieved by welding, riveting or by any other suitable method.

FIG. 3 shows adjustment of the slide module of FIG. 2 in further detail in accordance with certain example embodiments. The area of the slide module is roughly defined by the curved rectangle 300, the bottom portion of FIG. 3 presenting an enlargement of the slide module area. The guide rail part is basically split into the two parts 210 and 220 separated by the intermediate space 230. The base part 202 supports the guide rails 211 and 221 and/or guide rail parts 210 and 220, and each of the parts 210 and 220 is fixed to the base part 202 after adjusting the dimension A. The arrows 305 depict the direction in which the adjustment can occur. The fixing can be performed, for example, by welding (e.g., laser welding) or by riveting, or by both welding and riveting, or by another method.

An advantage of providing that dimension A is adjustable while parts of the slide module are assembled together is that the quality of the slide mechanism does not practically rely on tolerances of different parts. The slide mechanism is fully adjustable in the assembly process.

If desired, a spring or more than one spring can be installed in between the base assembly and the slider part 201 (the space depicted by reference numeral 315) so that the slide mechanism provided by the slide module becomes a spring assisted slide mechanism.

FIGS. 4a-4e show an example assembly method with the aid of adjustment jig(s) in accordance with certain example embodiments.

Figures 4A, 4B, 4C, 4D, 4E:
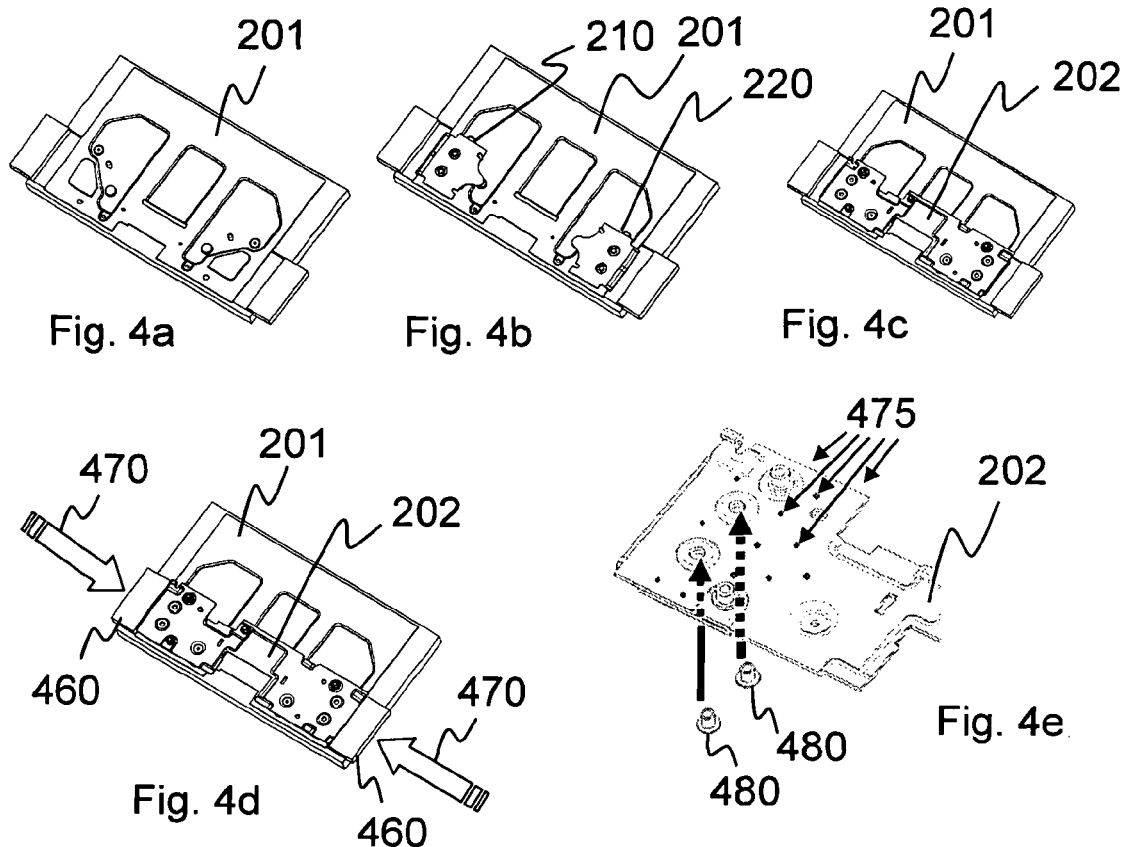
FIGS. 4a-4e show an example assembly method with the aid of adjustment jig(s) in accordance with certain example embodiments.

FIG. 4a depicts a slider part 201 of an apparatus. The apparatus can be the apparatus 100 shown in FIG. 1 or a corresponding apparatus. FIG. 4b depicts the guide rail parts 210 and 220 (comprising guide rails) attached to the slider part 201. FIG. 4c depicts the base part 202 attached onto the guide rail parts 210 and 220. FIG. 4d depicts adjustment of the guide rails against the slider part 201 with the aid of an adjustment jig (or jigs) 460. Each of the parts 210 and 220 is fixed to the base part 202 after adjusting the position of the guide rails of parts 210 and 220 in relation to the slider part 201 by adjusting the dimension between the guide rails of parts 210 and 220. The arrows 470 depict the direction in which the adjustment (during fixing) via the adjustment jig(s) 460 can occur. The guide rails can be pushed and/or moved back in that direction. Said fixing can be performed, for example, by welding (e.g., laser welding), or by riveting, or by both welding and riveting, or by any other suitable fixing method. FIG. 4e depicts possible welding points in certain example embodiments with small dots 475. In addition, riveting by rivets 480 through holes in the base part 202 can be used as a fixing method as depicted by the large arrows in FIG. 4e.

Figure 5:
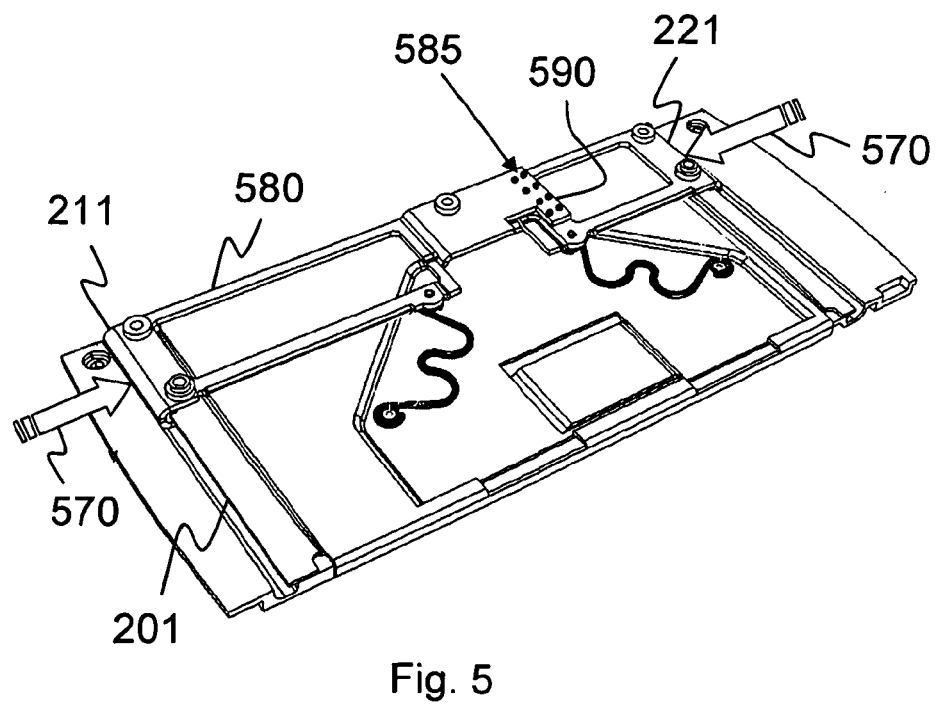
FIG. 5 shows a slide module in accordance with certain alternative embodiments.

FIG. 5 shows a slide module or mechanism in accordance with certain alternative embodiments. In these example embodiments, the guide rail part, in fact, is not split into two parts separated by an intermediate space, but the guide rail part is a combined part 580 comprising the first and second guide rails 211 and 221. It can also be contemplated that the guide rail part 580, in some example embodiments, comprises the first and second guide rail parts described in the foregoing slidingly attached to each other. The base part 202 described in the preceding can be omitted.

The length of the part 580 is adjustable during assembling. For that purpose, the guide rail part 580 may comprise a mechanism 590 allowing sections of the part 580 to overlap so that the length of the part 580 changes. The length of the part 580 is permanently fixed during the assembly process, after adjusting the position of the guide rails 211 and 221 in relation to the slider part 201 in the direction depicted by arrows 570. The guide rails 211 and 221 can be pushed and/or moved back in that direction. Said fixing can be performed, for example, by welding or riveting or by any other suitable fixing method. The arrow 585 shows a possible area in which fixing can be effected. Example fixing points have been depicted by a dot pattern in the area.

The foregoing description has provided by way of non-limiting examples of particular implementations and embodiments of the invention a full and informative description of the best mode presently contemplated by the inventors for carrying out the invention. It is however clear to a person skilled in the art that the invention is not restricted to details of the embodiments presented above, but that it can be implemented in other embodiments using equivalent means or in different combinations of embodiments without deviating from the characteristics of the invention.

In certain embodiments, for example, the format or shape of the parts is different from what has been presented in the foregoing example embodiments. In certain other embodiments, completely different parts from those presented in the foregoing embodiments are used.

Furthermore, some of the features of the above-disclosed embodiments of this invention may be used to advantage without the corresponding use of other features. As such, the foregoing description shall be considered as merely illustrative of the principles of the present invention, and not in limitation thereof. Hence, the scope of the invention is only restricted by the appended patent claims.

The invention claimed is:

1. An apparatus comprising:
   a slider part; and
   a base assembly slidingly movable in relation to the slider part with the aid of a first guide rail and a second guide rail in the base assembly, wherein a distance between the first guide rail and the second guide rail is adjustable while the apparatus is being assembled, wherein the base assembly consists of a single base part, a first guide rail part comprising the first guide rail and a first body section, and a second guide rail part comprising the second guide rail and a second body section, wherein the first guide rail part is attached or attachable to the single base part at least on the first body section and the second guide rail part is attached or attachable to the single base part at least on the second body section, wherein the position of the first guide rail part and the position of the second guide rail part, respectively, are individually adjustable.

2. The apparatus of claim 1, wherein the apparatus has a horizontal and a vertical axis such that the apparatus is of greater length along the vertical axis than the horizontal axis; and wherein the slider part and the base assembly are slidingly movable in relation to each other in a horizontal landscape direction which is parallel to the vertical axis of the apparatus.

3. The apparatus of claim 1, wherein the distance is adjustable after the slider part has been joined with the base assembly.

4. The apparatus of claim 1, comprising exactly two guide rails.

5. The apparatus of claim 1, wherein the apparatus is a mobile device.

6. A method comprising:
   providing an apparatus with a slider part and a base assembly slidingly movable in relation to the slider part with the aid of a first guide rail and a second guide rail in the base assembly; and
   adjusting a distance between the first guide rail and the second guide rail while assembling the apparatus, wherein the base assembly consists of a single base part, a first guide rail part comprising the first guide rail and a first body section, and a second guide rail part comprising the second guide rail and a second body section, wherein the first guide rail part is attached or attachable to the single base part at least on the first body section and the second guide rail part is attached or attachable to the single base part at least on the second body section, wherein the position of the first guide rail part and the position of the second guide rail part, respectively, are individually adjustable.

7. The method of claim 6, comprising:
   adjusting the distance with the aid of an adjustment jig.

8. The method of claim 6, comprising:
   individually adjusting the first guide rail part and the second guide rail part.

9. The method of claim 6, comprising:
   adjusting the first guide rail part and the second guide rail part in relation to each other after the slider part is joined with the base assembly.

10. The method of claim 6, comprising:
    movably attaching the first guide rail part and the second guide rail part to the single base part, and subsequently, fixing their position with a permanent attachment.

* * * * *